United States Patent
Christian

(10) Patent No.: US 7,727,927 B2
(45) Date of Patent: *Jun. 1, 2010

(54) METHOD OF MAKING TUNGSTEN-CONTAINING FUEL CELL CATALYSTS

(75) Inventor: Joel B. Christian, Towanda, PA (US)

(73) Assignee: Global Tungsten & Powders Corp., Towanda, PA (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/163,073

(22) Filed: Oct. 4, 2005

(65) Prior Publication Data

US 2006/0058183 A1    Mar. 16, 2006

Related U.S. Application Data

(63) Continuation-in-part of application No. 10/631,302, filed on Jul. 31, 2003, now Pat. No. 7,060,648, which is a continuation of application No. 09/965,444, filed on Sep. 27, 2001, now Pat. No. 6,656,870.

(60) Provisional application No. 60/522,479, filed on Oct. 5, 2004, provisional application No. 60/236,503, filed on Sep. 29, 2000.

(51) Int. Cl.
| | |
|---|---|
| B01J 23/00 | (2006.01) |
| B01J 37/34 | (2006.01) |
| B01J 20/34 | (2006.01) |
| B01J 19/08 | (2006.01) |
| B01J 19/12 | (2006.01) |
| C08F 2/46 | (2006.01) |
| C23C 14/06 | (2006.01) |
| C25B 11/04 | (2006.01) |
| C25B 11/12 | (2006.01) |
| C25B 11/03 | (2006.01) |
| C01B 31/00 | (2006.01) |
| H01M 4/02 | (2006.01) |
| C25D 5/00 | (2006.01) |

(52) U.S. Cl. .............. 502/182; 502/5; 502/20; 502/101; 502/514; 427/115; 427/122; 427/123; 427/126; 427/457; 427/487; 427/492; 427/530; 204/292; 204/294; 204/283; 204/284; 204/157.4; 204/157.47; 205/57; 205/147

(58) Field of Classification Search ............ 502/5, 502/108, 20, 101, 182, 514; 427/115, 122, 427/123, 126.1, 457, 487, 492, 530; 204/292, 204/294, 283, 284, 157.4, 157.47; 205/57, 205/147

See application file for complete search history.

(56) References Cited

U.S. PATENT DOCUMENTS 3,077,385 A    2/1963 Robb .................. 23/208

(Continued)

FOREIGN PATENT DOCUMENTS

WO    WO 02/27827    *    4/2004

OTHER PUBLICATIONS

J.B. Claridge et al., New Catalysts for the Conversion of Methane to Synthesis Gas: Molybdenum and Tungsten Carbide, *J. Catalysis*, 180, 85-100 (1998).

(Continued)

*Primary Examiner*—Patricia L Hailey
(74) *Attorney, Agent, or Firm*—Ballard Spahr LLP

(57) ABSTRACT

Activation of a tungsten-containing catalyst using water in a PEM-type fuel cell is described as well as cathode operation of the tungsten-containing catalyst.

17 Claims, 3 Drawing Sheets

Catalyst Activation Current Draw

U.S. PATENT DOCUMENTS

| | | | | |
|---|---|---|---|---|
| 3,335,025 | A | * | 8/1967 | Rightmire et al. ............ 427/453 |
| 3,480,470 | A | | 11/1969 | Nestor ......................... 136/86 |
| 3,480,479 | A | | 11/1969 | Nestor ......................... 136/86 |
| 3,507,701 | A | | 4/1970 | Broyde ........................ 136/86 |
| 3,515,679 | A | * | 6/1970 | Gaeth et al. ..................... 502/5 |
| 3,615,840 | A | | 10/1971 | Wolfe ....................... 136/86 D |
| 3,784,412 | A | | 1/1974 | Mund et al. ................. 136/122 |
| 3,790,410 | A | * | 2/1974 | Mund et al. ................. 502/101 |
| 3,848,062 | A | | 11/1974 | Steiger et al. ............... 423/440 |
| 3,902,917 | A | | 9/1975 | Baresel et al. ................ 136/86 |
| 3,907,600 | A | | 9/1975 | Pohl et al. .................. 136/121 |
| 3,943,005 | A | | 3/1976 | Mund ........................ 136/120 |
| 4,232,097 | A | | 11/1980 | Shanks et al. ................. 429/44 |
| 4,316,944 | A | | 2/1982 | Landsman et al. ............ 429/44 |
| 4,325,843 | A | | 4/1982 | Slaugh et al. ............... 252/443 |
| 4,339,424 | A | | 7/1982 | Jacobson et al. ............ 502/182 |
| 4,430,170 | A | | 2/1984 | Stern ........................... 204/39 |
| 4,481,303 | A | | 11/1984 | McIntyre et al. ............ 502/159 |
| 4,634,502 | A | * | 1/1987 | Callahan et al. ............. 205/148 |
| 4,702,784 | A | | 10/1987 | Naoumidis et al. ............ 156/89 |
| 4,822,699 | A | * | 4/1989 | Wan ............................ 429/40 |
| 4,910,181 | A | | 3/1990 | Angevine et al. ........... 502/321 |
| 4,990,372 | A | | 2/1991 | Sunder et al. ............... 427/237 |
| 5,084,144 | A | * | 1/1992 | Reddy et al. ................ 205/104 |
| 5,277,987 | A | | 1/1994 | Garg et al. .................. 428/457 |
| 5,298,343 | A | | 3/1994 | Savadogo et al. ............. 429/44 |
| 5,316,990 | A | * | 5/1994 | Cooper et al. ................... 502/5 |
| 5,470,673 | A | | 11/1995 | Tseung et al. ................. 429/44 |
| 5,922,488 | A | * | 7/1999 | Marucchi-Soos et al. ..... 429/44 |
| 5,939,220 | A | | 8/1999 | Gunner et al. ................. 429/40 |
| 5,945,231 | A | | 8/1999 | Narayanan et al. ............ 429/30 |
| 5,993,506 | A | | 11/1999 | Kobayashi et al. ............ 75/240 |
| 6,030,718 | A | | 2/2000 | Fuglevand et al. ............ 429/26 |
| 6,040,077 | A | | 3/2000 | Debe et al. .................... 429/40 |
| 6,183,894 | B1 | | 2/2001 | Adzic et al. ................... 429/13 |
| 6,258,239 | B1 | * | 7/2001 | Stab et al. ................... 205/104 |
| 6,291,090 | B1 | * | 9/2001 | Kuznetsov et al. ............ 429/27 |
| 6,551,569 | B1 | | 4/2003 | Christian et al. ............ 423/440 |
| 6,656,870 | B2 | * | 12/2003 | Christian et al. ............ 502/180 |
| 6,696,184 | B1 | * | 2/2004 | Christian et al. ............ 428/698 |
| 7,060,648 | B2 | | 6/2006 | Christian et al. ............ 502/180 |
| 2002/0111267 | A1 | | 8/2002 | Christian et al. ............ 502/182 |
| 2003/0059666 | A1 | | 3/2003 | Kourtakis ..................... 429/40 |
| 2003/0077460 | A1 | | 4/2003 | Christian et al. ............ 428/440 |
| 2005/0098437 | A1 | * | 5/2005 | Shiepe ........................ 205/109 |
| 2006/0257716 | A1 | | 11/2006 | Christian ..................... 429/40 |
| 2007/0269707 | A1 | * | 11/2007 | Lee et al. ...................... 429/44 |

OTHER PUBLICATIONS

Voorhies, Electrochemical and Chemical Corrosion of Tungsten Carbide (WC), *J. Electrochem. Soc.*, vol. 119, n. 2, pp. 219-222 (1972).

Binder et al., Tungsten Carbide electrodes for Fuel Cells with Acid Electrolytes, *Nature*, 224, 1299-1300 (1969).

Binder et al., Behavior of Tungsten Carbide in Electrodes for Fuel Cells with Acidic Electrolytes, *Energy Conversion*, 10, 25-28 (1970).

L.Bartha et al., Chemistry of Tungsten Oxide Bronzes, *Int. J. Refractory Metals & Hard Materials* 13 (1995) 77-91.

U.S. Appl. No. 09/675,510, filed Sep. 29, 2000.

P. Ross et al., The Relation of Surface Structure to the Electrocatalytic Activity of Tungsten Carbide, *J. Catalysis* 48 (1977) 42-59.

L. Baudendistel et al., Feul Cell Battery with Non-Noble Metal Electrodes and Acid Electrolyte, *Proc. of the 7th International Energy Conversion Engineering Conf.*, American Chemical Society (Wash. D.C. Sep. 1972) Paper No. 729004.

S. Liu, Electronic Structure of the Hypothetical Electrode Material $PtWO_3$, *Surface Science* 115 (1982) 633-637.

J. Bockris, Electrocatalysis of Oxygen Reduction by Sodium Tungsten Bronze, *J. Electrochem Soc.*, vol. 120, No. 1 (1973) 61-66.

P. Kulesza, Tungtsen Oxides as Active Supports for Highly Dispersed Platinum Microcenters: Electrocatalytic Reactivity Toward Reduction of Hydrogen Peroxide and Oxygen, *J. Electrochem. Soc.*, vol. 144, No. 6 (1997) 1911-1916.

Europe, Application No. 04758265.5, filed Mar. 25, 2004, Christian, Supplementary European Search Report, Aug. 27, 2007.

Europe, Application No. 04758265.5, filed Mar. 25, 2004, Christian, Official Communication, Apr. 30, 2008.

Europe, Application No. 04758265.5, filed Mar. 25, 2004, Christian, Response to Official Communication, Oct. 30, 2008.

PCT/US2004/009019, filed Mar. 25, 2004, Christian, International Search Report, Aug. 10, 2004.

PCT/US2004/009019, filed Mar. 25, 2004, Christian, Written Opinion, Aug. 10, 2004.

* cited by examiner

METHOD OF MAKING TUNGSTEN-CONTAINING FUEL CELL CATALYSTS

CROSS REFERENCES TO RELATED APPLICATIONS

This application is a continuation-in-part of application Ser. No. 10/631,302, filed Jul. 31, 2003 which is a continuation of application Ser. No. 09/965,444, filed Sep. 27, 2001, now U.S. Pat. No. 6,656,870, issued Dec. 2, 2003, which claims the benefit of U.S. Provisional Application No. 60/236,503, filed Sep. 29, 2000, the disclosures of which are hereby incorporated by reference. This application claims the benefit of U.S. Provisional Application No. 60/522,479, filed Oct. 5, 2004.

BACKGROUND OF THE INVENTION

Fuel cells produce electricity by converting reactants such as hydrogen, hydrocarbons, and oxygen into products such as water and carbon dioxide, and electrical energy. In general, a typical low-temperature fuel cell comprises an anode and cathode separated by an electrolyte. The anode and cathode consist of a conductive support having a thin layer of a catalyst uniformly dispersed over the surface of the support. During operation, a continuous flow of fuel is fed to the anode while, simultaneously, a continuous flow of oxidant is supplied to the cathode.

In a conventional low temperature $H_2/O_2$ fuel cell, a hydrogen gas fuel is oxidized with the aid of a platinum catalyst at the anode to generate electrons and protons which travel by separate paths to the cathode. The electrons are conducted through an external circuit and the protons are conducted through the electrolyte. At the cathode, oxygen gas combines with the electrons and protons to produce water, again with the aid of a platinum catalyst. The current generated by the electrons flowing through the external circuit can be used for work.

A fuel cell configuration of particular importance is the proton-exchange membrane (PEM) fuel cell. In a typical PEM fuel cell, the electrolyte is a solid polymeric material capable of conducting protons, e.g., a perfluorosulfonic acid polymer (e.g., Nafion® by DuPont). The proton-conducting polymer membrane is sandwiched between membrane electrode assemblies (MEA) formed from platinum catalysts dispersed on carbon black. Examples of these devices are described in U.S. Pat. Nos. 6,030,718, 6,040,007 and 5,945,231 which are incorporated herein by reference.

Platinum catalysts are preferred for fuel cells because of their high electrochemical activity. However, platinum is expensive and easily poisoned by the trace amounts of carbon monoxide typically found in hydrogen fuels. Numerous attempts have been made to find less expensive electrocatalysts or reduce the sensitivity of platinum catalysts to carbon monoxide. Several of these attempts have focused on tungsten and molybdenum compounds, and in particular their carbides and oxides. For example, U.S. Pat. No. 5,922,488 describes a CO-tolerant anode catalyst which uses a carbon-supported, platinum-dispersed, non-stoichiometric hydrogen tungsten bronze having the formula Pt—$H_xWO_3$ wherein x ranges from about 0.05 to about 0.36. U.S. Pat. No. 5,298,343 describes a polycomponent electrocatalyst comprised preferably of platinum or palladium and a chemical component selected from the group consisting of tungstic acid, molybdic acid, ammonium tungstate, ammonium molybdate, sodium tungstate and sodium molybdate. U.S. Pat. No. 5,945,231 contemplates combining tungsten carbide with ruthenium oxide or ruthenium to form a catalysts for a direct liquid-feed fuel cell. Unfortunately, these tungsten and molybdenum-based catalysts have not been shown to exhibit an acceptable level of electrochemical activity for practical fuel cell application without the additional presence of an expensive co-catalyst. Therefore, it would be an advantage to have a tungsten-containing fuel cell catalyst which exhibits a high electrochemical activity without an expensive co-catalyst.

SUMMARY OF THE INVENTION

It is an object of the invention to obviate the disadvantages of the prior art.

It is another object of the invention to provide a method of making a tungsten-containing fuel cell catalyst in situ in a fuel cell.

In accordance with an object of the invention, there is provided a method of making a tungsten-containing fuel cell catalyst comprising the steps of: (a) depositing a tungsten-containing precursor on a carbon support; (b) contacting the support with water; (c) applying a voltage to the support sufficient to form the tungsten-containing catalyst.

In accordance with another aspect of the invention, there is provided a method of making a tungsten-containing fuel cell catalyst comprising the steps of: (a) mixing a carbon black with a solution of a tungsten-containing precursor to form a dispersion; (b) drying the dispersion to form a supported catalyst precursor; (c) forming an electrode using the supported catalyst precursor; (d) contacting the catalyst precursor with water; and (e) applying a voltage to the electrode sufficient to form the tungsten-containing catalyst.

Preferably, the tungsten-containing precursor yields a tungstate anion, $WO_4^{-2}$, in an aqueous solution. Such preferred tungsten-containing precursors include ammonium tungstate, sodium tungstate, or tungstic acid. More preferably, the tungsten-containing precursor is a tungsten heteropoly salt such as ammonium metatungstate (AMT) or sodium metatungstate. The loading of the catalyst precursor onto the carbon support may be increased by using a cationic surfactant such as cetylpyridinium chloride. In a preferred method, carbon black is contacted with a solution of the cationic surfactant, mixed, dried, and milled prior to being dispersed in an aqueous solution of the tungsten-containing precursor. The use of the surfactant can increase the tungsten loading by a factor of two from a typical loading of about 20 weight percent (wt. %) tungsten to about 40 wt. % tungsten.

DETAILED DESCRIPTION OF THE INVENTION

Figure 1:
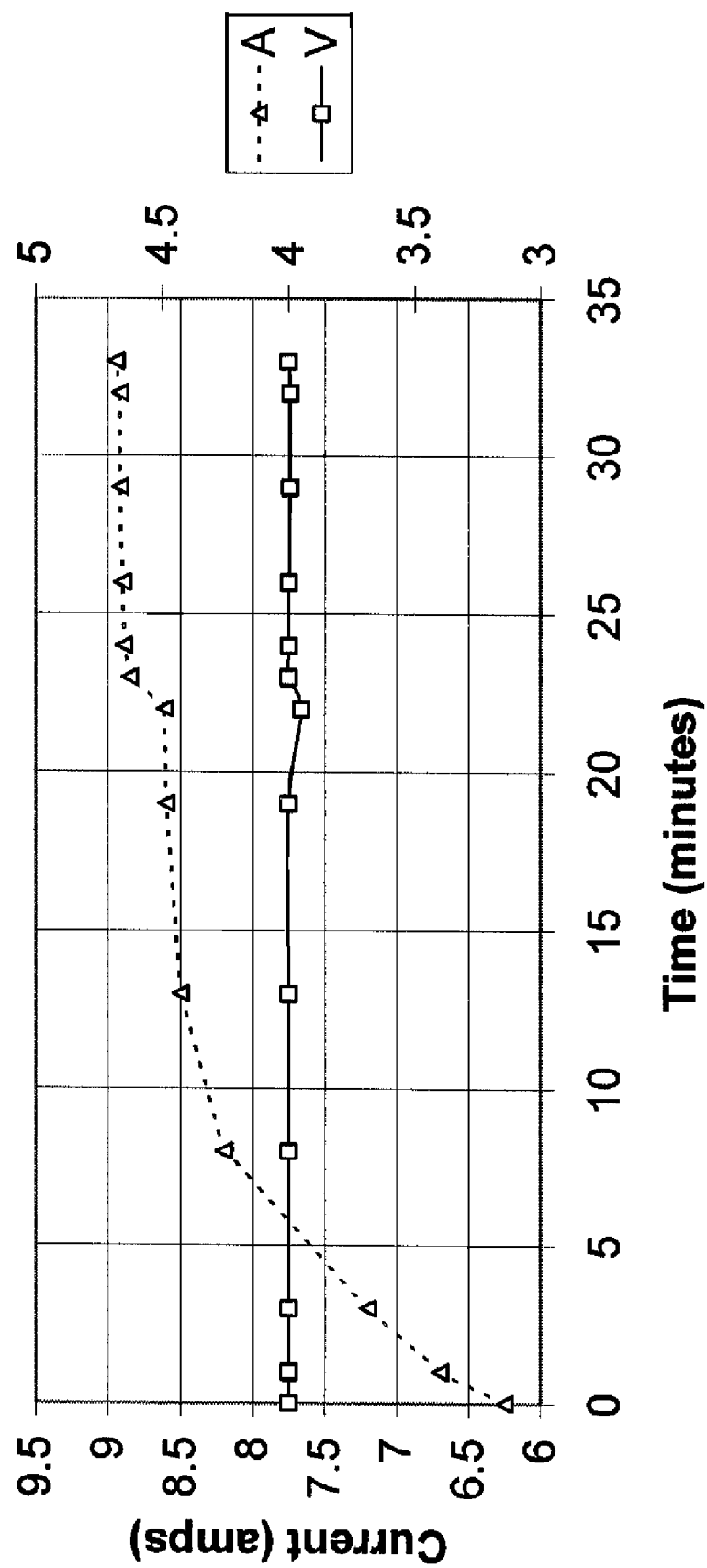
FIG. 1 shows an activation profile for the method described in U.S. Pat. No. 6,656,870 using deionized water as the fluid component instead of an electrolyte.

For a better understanding of the present invention, together with other and further objects, advantages and capabilities thereof, reference is made to the following disclosure and appended claims taken in conjunction with the above-described drawings.

U.S. Pat. No. 6,656,870, which is incorporated herein by reference, describes a tungsten-containing fuel cell catalyst and a method for activating the catalyst in situ in a fuel cell. The catalyst is formed by a low temperature (less than about 100° C.) electrochemical activation of a tungsten-containing precursor which has been deposited on a carbon support, e.g., graphite, activated carbon or carbon black. The dried supported catalyst precursor is formed into a conventional PEM cell membrane-electrode assembly (MEA) which forms the anode of the PEM cell. The cathode of the PEM cell is an MEA made with a platinum catalyst. Once the PEM cell is constructed, an electrolyte solution is added. Preferably the electrolyte solution contains a fluid-based carbon source, e.g., an alcohol, an aqueous carbonate, an organic acid solution, or bubbled CO or $CO_2$ gas. A preferred electrolyte solution is 2M $Na_2CO_3$. A voltage is applied to activate the precursor to form the tungsten-containing catalyst. Preferably, the applied voltage is from about 0.5 volt to about 30 volts DC. In general, the voltage need only be applied until the current demand substantially decreases, normally within one minute. However, it is preferred to apply the voltage for about 30 minutes to insure activation of the catalyst. The PEM cell anode is connected to the negative DC source and the PEM cell cathode is connected to the positive DC source. Thus, the electrochemical roles of the anode and cathode are reversed with respect to normal PEM cell operation.

In the above-described activation method, the electrolyte is believed to serve several functions: (1) to provide waters of reaction and hydration; (2) to provide cooling; (3) to shield the liquid-solid interface from gas bubbles or foam (which could reduce formation of active sites); and (4) to provide electrical conduction to the cell. For the last reason, it was believed that the electrolyte should be of a sufficiently high concentration to promote electrical conduction. However, in the PEM cell, conduction may be provided by the supporting carbon framework, conductive backing layer, and by the backing plates. For this reason, the fluid component of the cell need not be conductive in a PEM cell activation as was previously believed. Therefore, any compatible fluid might be used, including plain water. Preferably, the fluid is deionized water having a conductivity of less than about 5 μmhos and preferably a silica content of less than about 2 ppm.

Furthermore, in the PEM cell system, the activation can and will occur with only the minimum amount of stoichiometric water required to complete the synthesis mechanism. Thus, water could be supplied by a humidified gas stream for a nearly dry activation.

Figure 2:
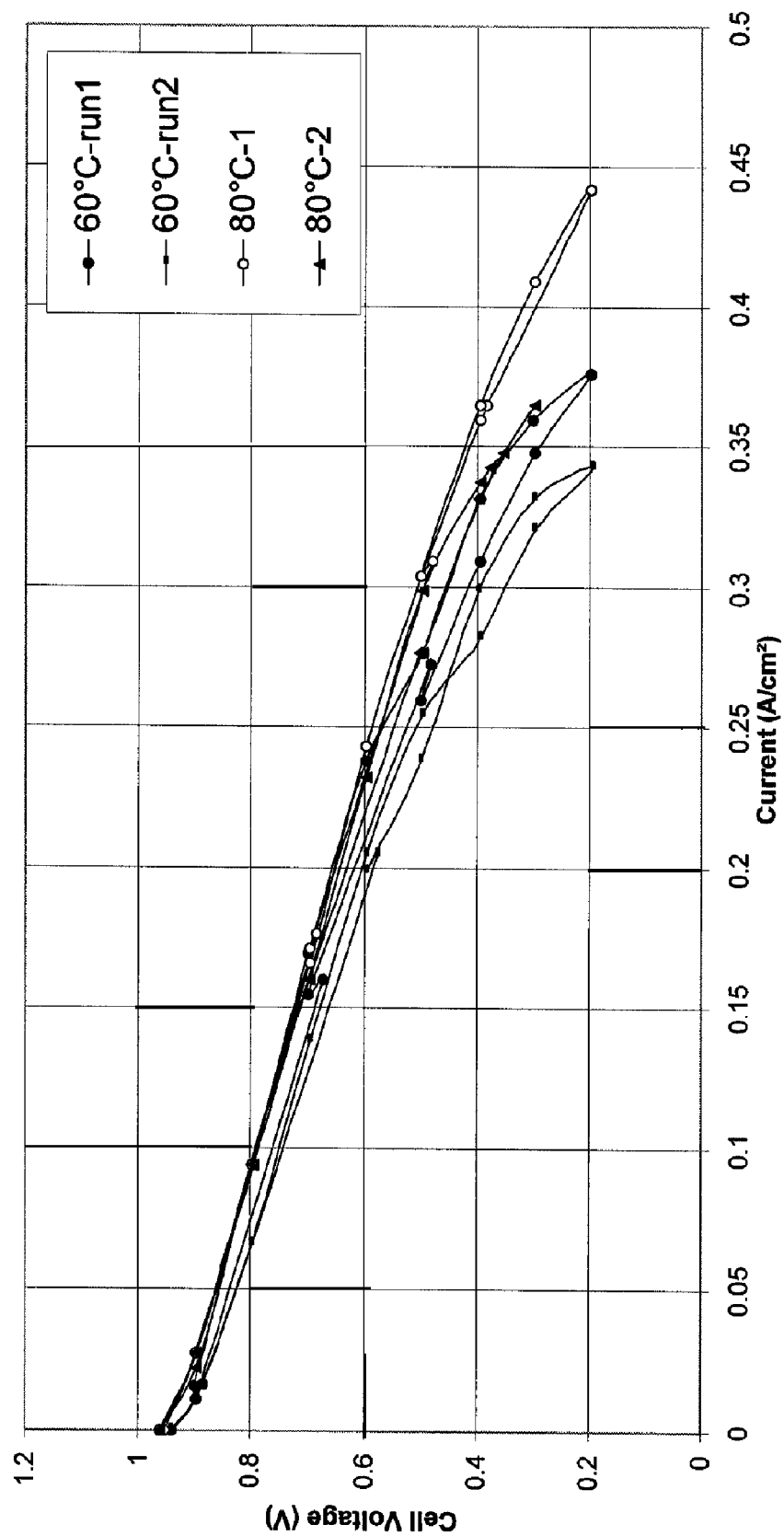
FIG. 2 shows the initial performance curves for a water-activated W-containing catalyst in a fuel cell.

FIG. 1 shows an activation profile for the activation method according to U.S. Pat. No. 6,656,870 using deionized water as the fluid instead of an electrolyte. FIG. 2 shows the initial performance curves for the W-containing anode and Pt cathode catalyst at 60° C. and 80° C. ($H_2$:Air). These curves show an activity for the tungsten-containing catalyst at about ⅕ to ⅒ of the activity of state-of-the-art Pt catalysts.

A 5 $cm^2$ PEM fuel cell was constructed using a Pt catalyst on the anode side, and a cathode catalyst precursor of ammonium metatungstate on carbon. The catalyst was activated at 4 VDC for about 25 minutes using flowing deionized water as the fluid.

Figure 3:
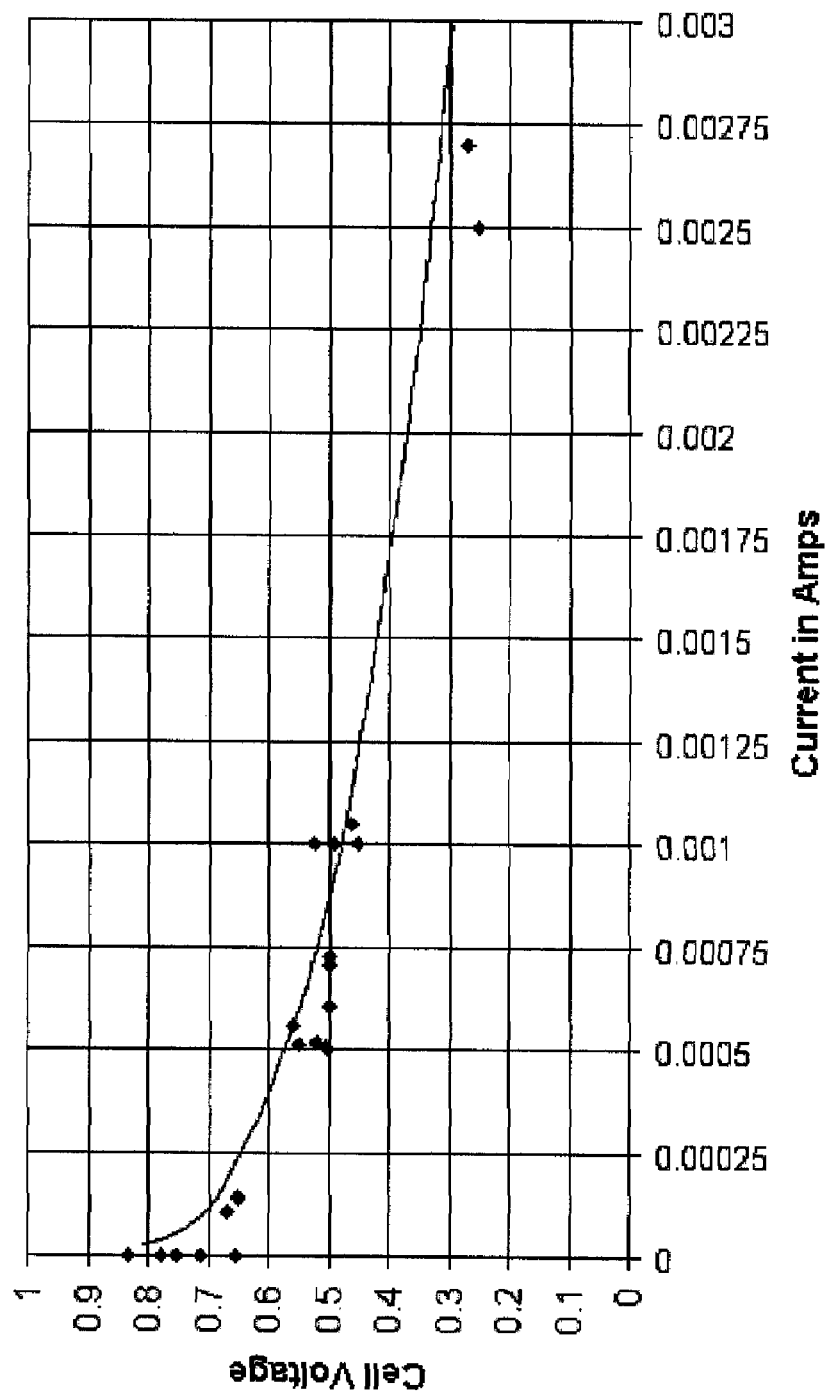
FIG. 3 demonstrates the tungsten-containing catalyst in operation as a cathode catalyst.

FIG. 3 shows the initial performance curves for the W-containing cathode and Pt anode catalysts ($H_2$:air) This cell was run from about seven days without a significant power loss. A Keithly 2420 Sourcemeter was used as a constant-current load on the operating cell at +1.05021 mA. A voltage loss of 0.000001 V/day was observed over two days. The characteristic fuel-cell-type performance curve at varying power levels can be seen in FIG. 3.

An additional test was performed with an activation with water on the cathode (tungsten-containing) side only, the other side being dry. The 5 $cm^2$ cell yielded 0.56V at 1.05 mA constant sink current.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A method of making a tungsten-containing fuel cell catalyst comprising the steps of:
    (a) depositing a tungsten-containing precursor on a carbon support, wherein the carbon support has been preteated with a cationic surfactant;
    (b) contacting the support with water;
    (c) applying a voltage to the support sufficient to form the tungsten-containing catalyst.

2. The method of claim 1 wherein the applied voltage is about 0.5 VDC to about 30 VDC.

3. The method of claim 2 wherein the applied voltage is 4 VDC.

4. The method of claim 1 wherein the tungsten-containing precursor is ammonium tungstate, sodium tungstate, tungstic acid or a tungsten heteropoly salt.

5. The method of claim 1 wherein the tungsten-containing precursor is a tungsten heteropoly salt.

6. The method of claim 1 wherein the tungsten-containing precursor is ammonium metatungstate or sodium metatungstate.

7. The method of claim 1 wherein the carbon support is a carbon black.

8. The method of claim 1 wherein the cationic surfactant is cetylpyridinum chloride.

9. The method of claim 1 wherein the water is deionized water.

10. The method of claim 1 wherein the support is a cathode of the fuel cell.

11. A method of making a tungsten-containing fuel cell catalyst comprising the steps of:
    (a) mixing a carbon black with a solution of a tungsten-containing precursor to form a dispersion, wherein the carbon black has been pretreated with a cationic surfactant;
    (b) drying the dispersion to form a supported catalyst precursor;
    (c) forming an electrode using the supported catalyst precursor;
    (d) contacting the catalyst precursor with water; and
    (e) applying a voltage to the electrode sufficient to form the tungsten-containing catalyst.

12. The method of claim 11 wherein the tungsten-containing precursor is ammonium tungstate, sodium tungstate, tungstic acid, or a tungsten heteropoly salt.

13. The method of claim 11 wherein the tungsten-containing catalyst is formed in situ in a proton-exchange membrane fuel cell.

14. The method of claim 13 wherein the electrode is a cathode of the fuel cell.

15. The method of claim 11 wherein the applied voltage is from about 0.5 VDC to about 30 VDC.

16. The method of claim 15 wherein the applied voltage is 4 VDC.

17. The method of claim 11 wherein the cationic surfactant is cetylpyridinum chloride.

* * * * *